United States Patent
Kazama et al.

[11] Patent Number: 6,111,580
[45] Date of Patent: *Aug. 29, 2000

[54] APPARATUS AND METHOD FOR CONTROLLING AN ELECTRONIC DEVICE WITH USER ACTION

[75] Inventors: Hisashi Kazama, Hyogo-ken; Kazunori Onoguchi, Osaka-fu; Mayumi Yuasa, Hyogo-ken; Kazuhiro Fukui, Osaka-fu, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,493
[22] Filed: Sep. 6, 1996

[30] Foreign Application Priority Data

Sep. 13, 1995 [JP] Japan .................................. 7-235834

[51] Int. Cl.$^7$ .................................................. G06F 3/00
[52] U.S. Cl. .......................................................... 345/358
[58] Field of Search ............................... 345/326, 358, 345/327, 978, 156, 157, 158; 704/246, 251, 260, 275; 364/400.01, 709.01, 709.02, 188, 146; 351/209, 210; 382/117, 118

[56] References Cited

U.S. PATENT DOCUMENTS

| | | | |
|---|---|---|---|
| 4,595,990 | 6/1986 | Garwin et al. | 364/709.11 |
| 4,836,670 | 6/1989 | Hutchinson | 351/210 |
| 4,975,960 | 12/1990 | Petajan | 704/251 |
| 5,016,282 | 5/1991 | Tomono et al. | 382/117 |
| 5,086,385 | 2/1992 | Launey et al. | 364/188 |
| 5,381,158 | 1/1995 | Takahara et al. | 345/156 |
| 5,524,195 | 6/1996 | Clanton, III et al. | 345/327 |
| 5,541,585 | 7/1996 | Duhame et al. | 340/825.69 |
| 5,594,469 | 1/1997 | Freeman et al. | 345/158 |
| 5,621,662 | 4/1997 | Humphries et al. | 364/550 |

FOREIGN PATENT DOCUMENTS

| | | |
|---|---|---|
| 1188925 | 7/1989 | Japan . |
| 1314320 | 12/1989 | Japan . |
| 2173696 | 7/1990 | Japan . |
| 2178721 | 7/1990 | Japan . |
| 387818 | 4/1991 | Japan . |
| 3107932 | 5/1991 | Japan . |
| 3107933 | 5/1991 | Japan . |
| 3107934 | 5/1991 | Japan . |

*Primary Examiner*—Matthew M. Kim
*Assistant Examiner*—Crescelle N. dela Torre
*Attorney, Agent, or Firm*—Finnegan, Henderson, Farabow, Garrett & Dunner, L.L.P.

[57] ABSTRACT

An input unit for controlling a device. The input unit first determines whether a user is actively operating the device. If such a detection is made, the input unit then determines whether the user performs an act that corresponds to a command. User attention may be indicated by a user observing the device, approaching the device, facing the device, or speaking. An input command may be indicated by touch, gesture, speech, or line of sight.

21 Claims, 14 Drawing Sheets

(UPPER DIRECTION)

(A FULL FACE)

(LOWER DIRECTION)

(RIGHT DIRECTION)

(LEFT DIRECTION)

APPARATUS AND METHOD FOR CONTROLLING AN ELECTRONIC DEVICE WITH USER ACTION

BACKGROUND OF THE INVENTION

1. Field of the Invention

The present invention relates to an input apparatus and method. In particular, the present invention allows a user to simply operate home and office equipment by visual line input or gesture input.

2. Description of the Related Art

An input apparatus using the user's visual line, sound, or gesture allows the user to simply operate home electronic equipment. In near future, this kind of the input apparatus will be used in the home and office. In this kind of input apparatus, the input indication is a simple action of the user. For example, the user's visual line may control the scroll of the display of a computer (Japanese Patent Disclosure (Kokai) No.2-173696) or automatically move a cursor to a position which the user is watching on the display (Japanese Patent Disclosure (Kokai) No.2-178721).

The area observed by the user (or watching point) may control a device, some cameras use a user's watching point for control. In an apparatus for selecting operational features by visual line, a user watches a selected feature symbol in the view finder to turn the selected feature on and off (Japanese Patent Disclosure (Kokai) No.3-87818) a camera focuses on the point watched by the user. (Japanese Patent Disclosure (Kokai) No.3-107932) A camera may measure the exposure value at a point watched by the user (Japanese Patent Disclosure (Kokai) No.3-107933 and Japanese Patent Disclosure (Kokai) No.3-107934).

An input apparatus may use the user's gestures. For example, a plurality of pressure sensors are attatched to a surface of a glove for the user's hand data is then inputted by pushing fingers of the glove against each other (Japanese Patent Disclosure (Kokai) No.1-314320). As another example, an acceleration sensor is placed on a glove. The cursor on a display is moved by the movement of the user's hand (Japanese Patent Disclosure (Kokai) No.1-188925).

In the above input apparatus example, the control indication is a simple action. The input apparatus may undesirably react to the user's unconscious action however and operate the equipment without the user's intention. For example, in a visual line computer control, the cursor will move to an undesirable position if the user coughs or looks back in confusion because of another person's voice.

In input devices recognizing the actions of the user's hand and body, the input apparatus often erroneously operates the equipment according to the user's unconscious action. With a sensor glove, all of the conscious and unconscious movements of the user's hand impact the operation of the equipment. If the input apparatus uses an image, a TV camera may moniter the image of the user. Each movement of the user may impact the equipment. Therefore, the user must always be careful not to indicate unnecessary action. However, if the indication of the user's action is limited to unnatural specified action, the user can not indicate by simple action.

If many input devices are used in the same home or office, multiple input devices may detect one gesture of the user. Additionally, several people may be in the same room. Only some of the people may intend to operate equipment, but the input device may record lines of sight or gestures from non-operaters. In these situations, the equipment reacts contrary to the user's intention.

To descriminate the user's true intention, a voice discrimination circuit may be used or a decision means for evaluating indications of plural commands. However, high level-recognition such as voice discrimination is necessary for the input apparatus or the input apparatus can not react if the user does not perform plural gestures. As a result, this kind of input apparatus is not practical.

SUMMARY OF THE INVENTION

It is an object of the present invention to provide an input apparatus and method for the user to simply specify the equipment to be activated and to input an indication signal by a simple action of the user.

According to the present invention, there is provided an input apparatus for detecting user's action and for outputting operation corresponding to the action, comprising: attention degree detection means for detecting attention status of the user for operation object in accordance with first action of the user; action indication detection means for detecting action indication of the user for the operation object in accordance with second action of the user; and operation output means for outputting operation corresponding to the action indication in case of detecting the attention status of the user.

Further in accordance with the present invention, there is provided a method for detecting user's action and for outputting operation corresponding to the action, comprising the steps of; detecting attention status of the user for operation object in accordance with first action of the user; detecting action indication of the user for the operation object in accordance with second action of the user; and outputting operation corresponding to the action indication in case of detecting the attention status of the user.

DETAILED DESCRIPTION OF THE PREFERRED EMBODIMENTS

An input unit controls a device. The input unit first determines whether the user's attention is directed to the device. If such a detection is made, the input unit then determines whether the user performs an act that corresponds to a command. The input unit then controls the device according to the command.

The embodiments of the present invention are described below with reference to the drawings.

Figure 1:
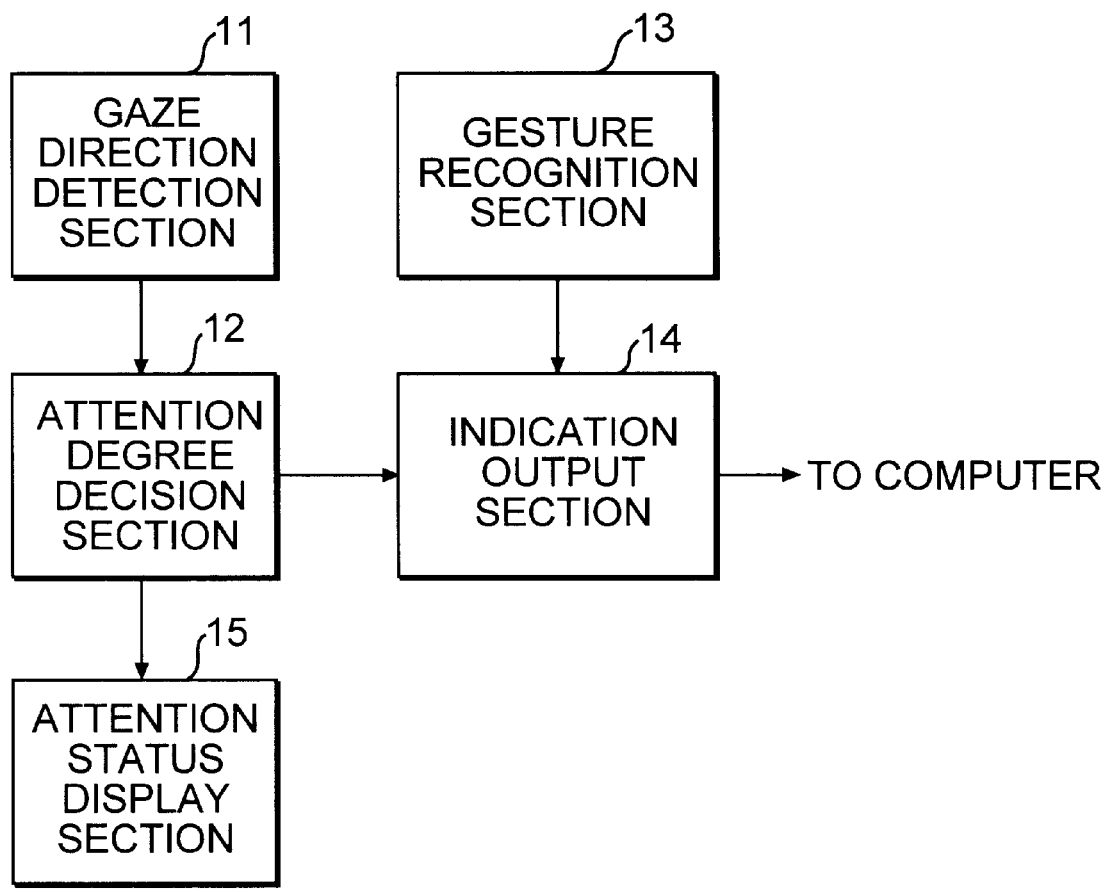
FIG. 1 is a block diagram of an input apparatus according to a first embodiment of the present invention.

FIG. 1 is a schematic diagram of the input apparatus according to a first embodiment of the present invention. The input apparatus of the first embodiment controls a computer display (for example, a screen saver) according to the user's gaze of sight and gesture. As shown in FIG. 1, the input apparatus is comprised of a gaze direction detection section 11, an attention degree decision section 12, a gesture recognition section 13, an indication output section 14, and an attention status display section 15.

Figure 2:
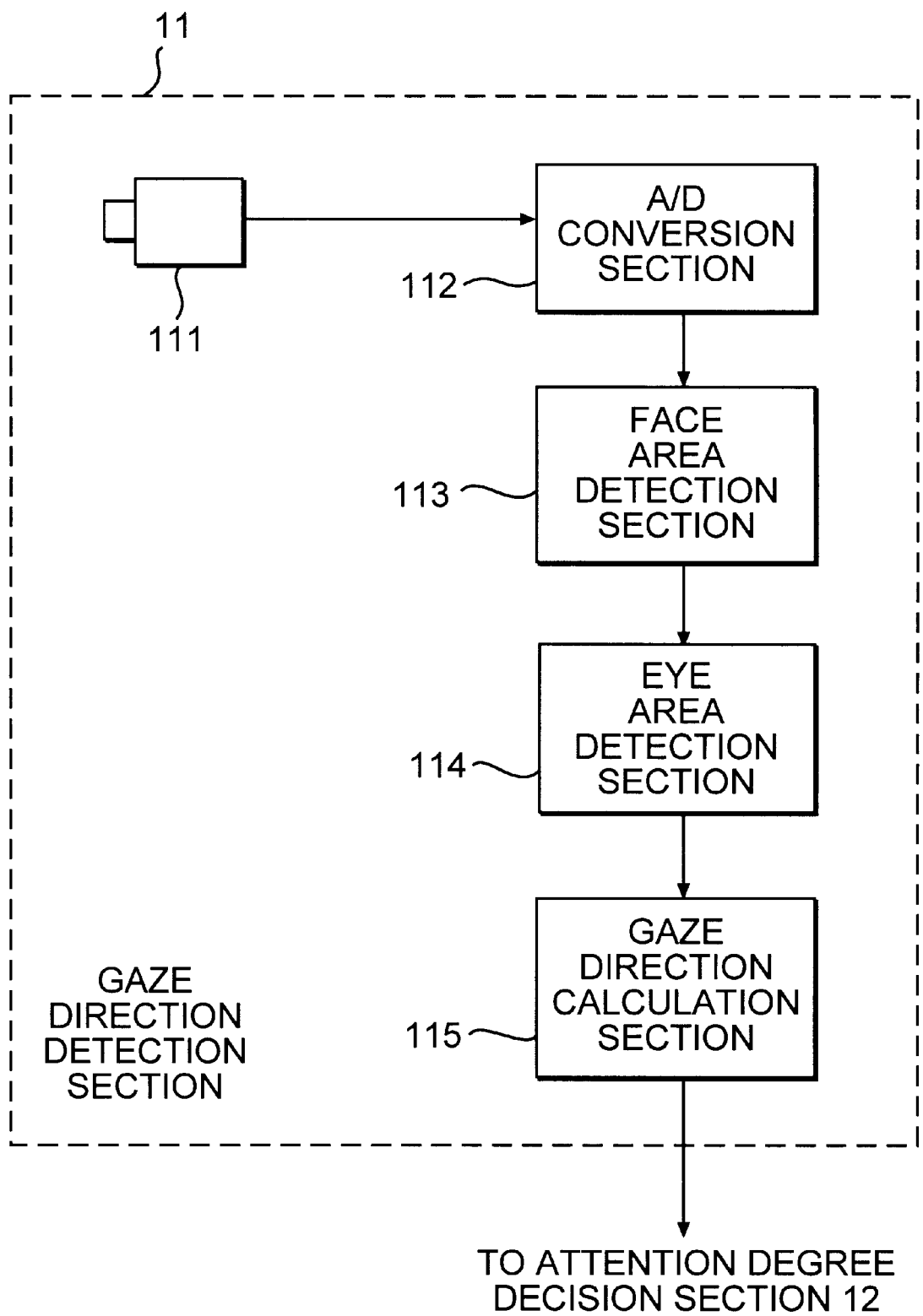
FIG. 2 is a block diagram of a gaze direction detection section according to the first embodiment.

FIG. 2 is a schematic diagram of the gaze direction detection section 11. The gaze direction detection section 11 is comprised of a TV camera 111, an A/D conversion section 112, face area detection section 113, an eye area detection section 114, and a gaze direction calculation section 115.

Figure 3A:
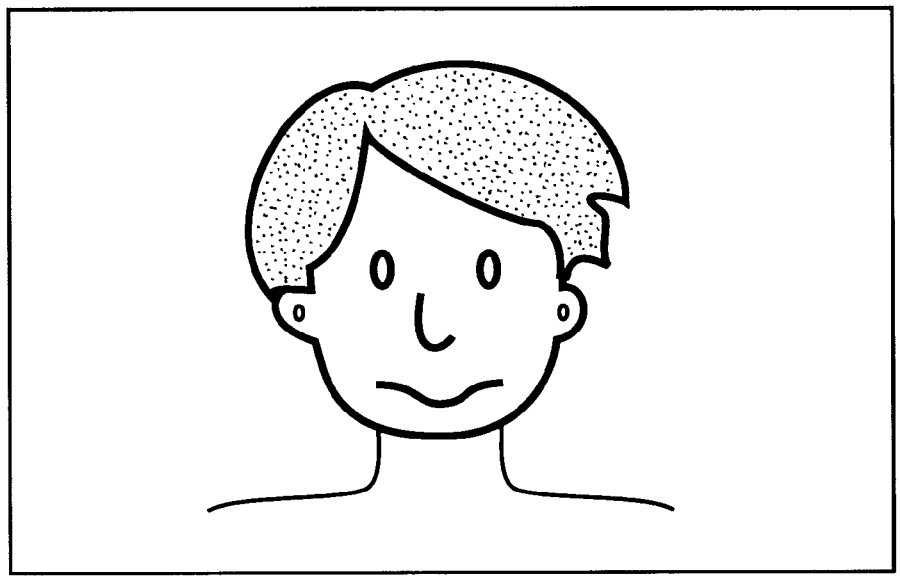
FIG. 3A is a schematic diagram of the full frontal view face of the user.

FIG. 3a is an image of the user's face inputted through the TV camera 111. A video signal of the image from the TV camera 111 is converted to a digital image by the A/D conversion section 112. The digital image signal is outputted to the face area detection section 113. The face area detection section 113 extracts a face area of the user from the digital image. The extraction is executed based on skin color of the user's face. In this case, the user previously sets the face's color or the hand's color to the computer to detect the predetermined area. The face area information is outputted to the eye area detection section 114. The eye area detection section 114 extracts the left eye area and right eye area from the face area information. As for this extraction, upper black-circle parts located symmetrically along a center axis are extracted from the face area. Then, the center position of each eye is detected and outputted to the gaze direction calculation section 115. The gaze direction calculation section 115 calculates gaze direction of the user according to the center position of both eyes.

In the prior art, the gaze direction is directly used to control the display of the computer. However, in the present invention, the gaze direction is used to determine the attention status of the user. Therefore, the gaze direction is outputted to the attention degree decision section 12. The attention degree decision section 12 calculates the point watched on the display according to the gaze direction. If the watching point is located within a predetermined radius of the center point of the display, it is decided that the user is paying attention to the display.

There are other methods of determining the user's attention status. For example, the length of the attention period is measured, and the display is decided to be under the status of attention of the user if the continuous time is larger than a threshold. In short, a specific feature of the present invention is that the user's attention status and the user's command instruction are separately detected.

Figure 4:
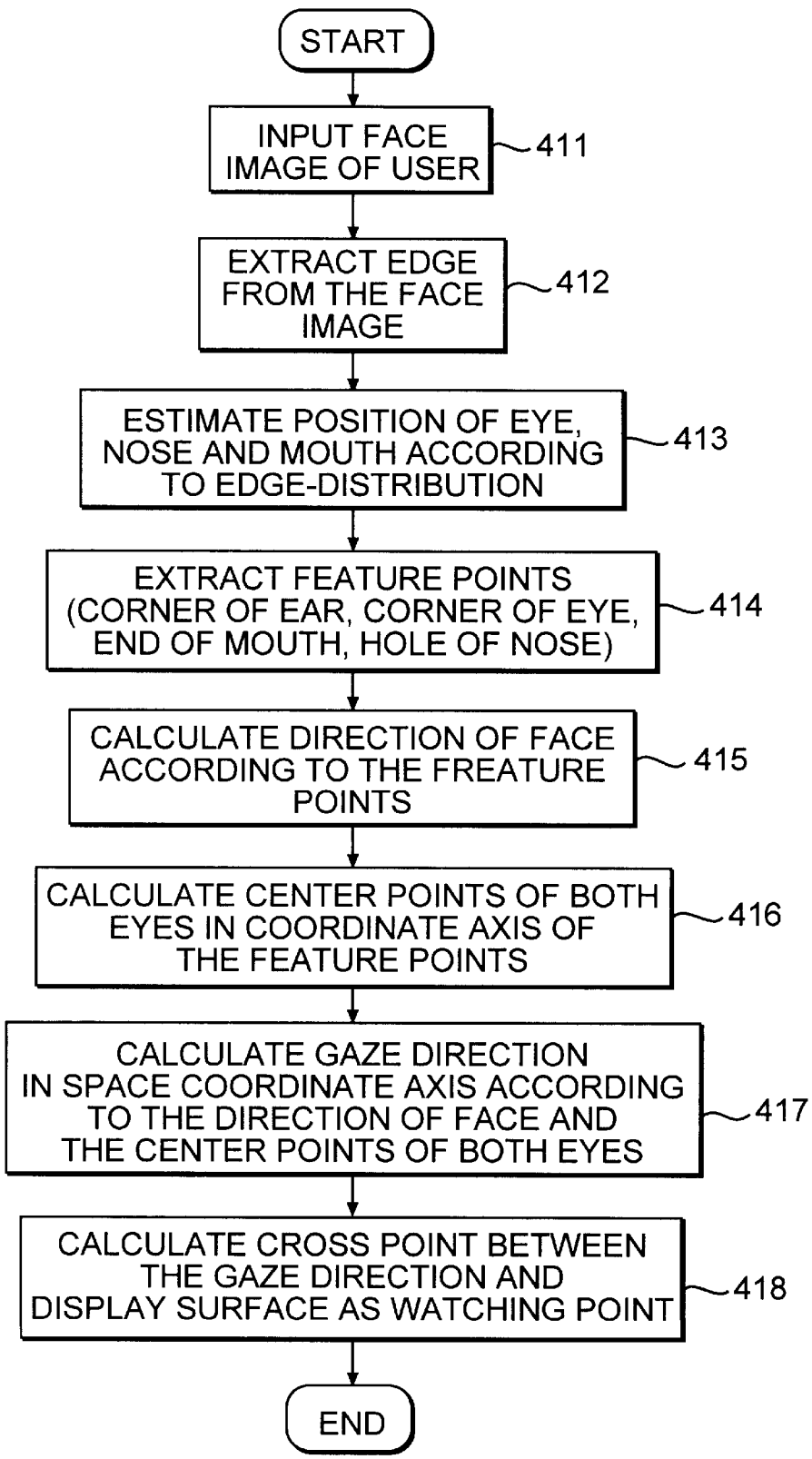
FIG. 4 is a flow chart of a calculation of view point-position according to the first embodiment.
Figures 5A, 5B, 5C:
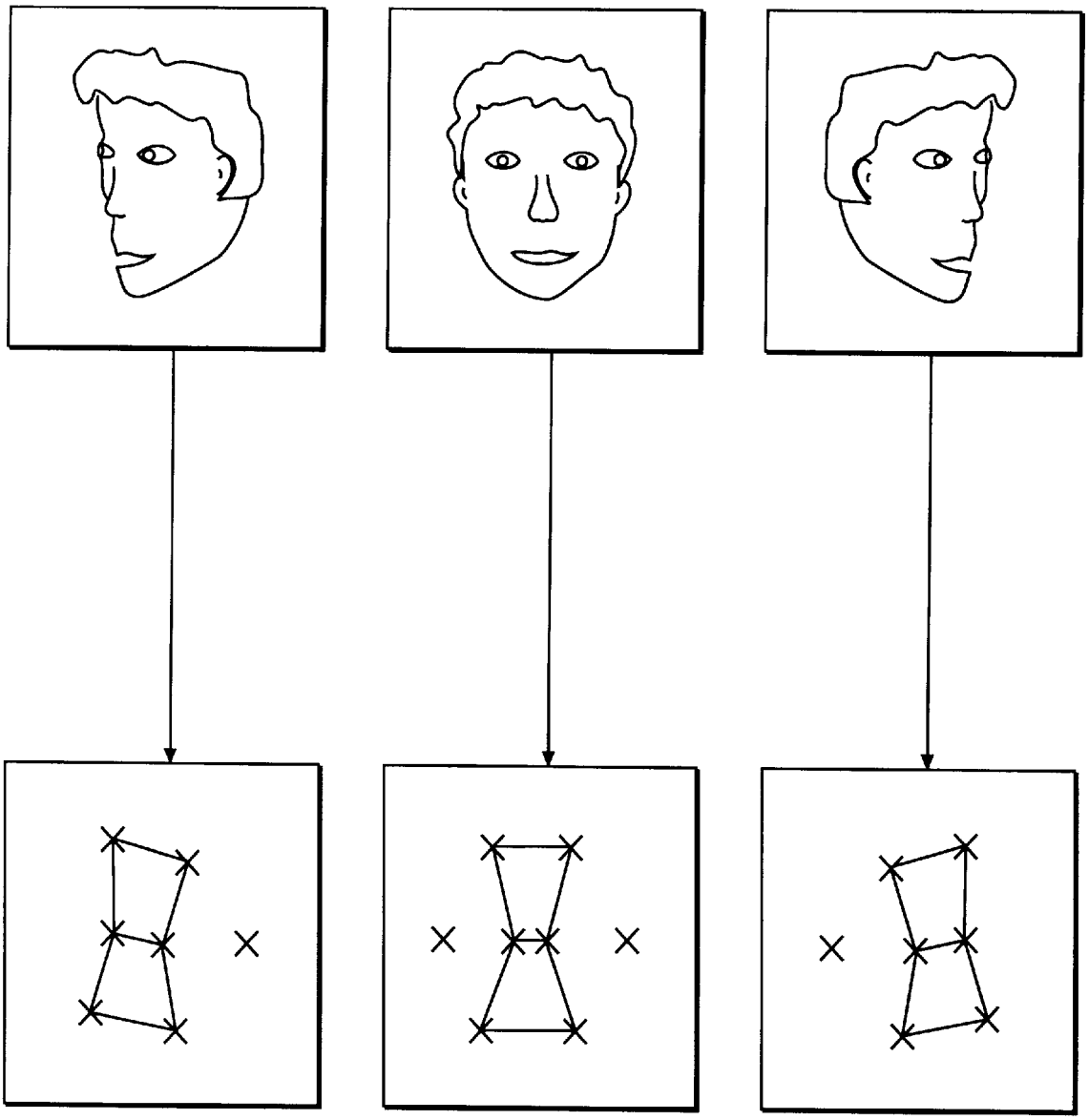
FIGS. 5A–5C are schematic diagrams of relationship between face images and characteristic points of the face.

FIG. 4 is a flow chart of a calculation of view-point position. FIGS. 5A, 5B, and 5C are schematic diagrams of relations between face images and feature points of the face. FIGS. 6A, 6B, 6C, 6D, 6E are schematic diagrams of the feature points of faces corresponding to respective directions. The information in FIG. 6A–6E may be prestored in the input device.

In FIG. 4, the face image of the user is input, and the edge of the face image is extracted (step 411, 412). Then, the eye, nose, and mouth positions are estimated according to the edge distribution (step 413), and various feature points (corner of ear, corner of eye, end of mouth, and nostrils) are extracted from the estimated position (step 414). The direction of the face of the user using a coordinate axis based on the figure of the feature points is calculated according to the feature points (step 415).

Figure 6A:
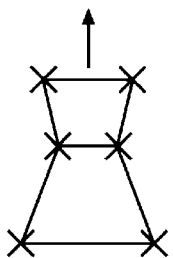
FIGS. 6A, 6B, 6C, 6D and 6E are schematic diagrams of the feature points of faces corresponding to respective directions.
Figure 6B:
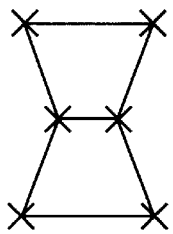
Figure 6C:
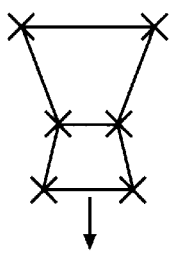
Figure 6D:
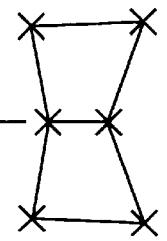
Figure 6E:
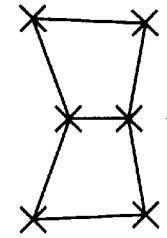

In FIGS. 5A–5C, the upper three pictures show face images of the user corresponding to three directions and the lower three pictures show feature points extracted from the upper three face images respectively. FIG. 6A shows a pattern of the feature points when the user's face is directed upward. FIG. 6B shows a pattern of the feature points when the user's face is directed forward or a full frontal view face is presented (normal pattern). FIG. 6C shows a pattern of the feature points when the user's face is directed downward. FIG. 6D shows a pattern of the feature points when the user's face is directed to the right. FIG. 6E shows a pattern of the feature points when the user's face is directed to the left. In this way, the direction of the face is decided according to a transformation of the figure consisting of the feature points. Then, the center points of both eyes in coordinate axis based on the figure of the characteristic points are calculated (step 416). The gaze direction (visual line vector) of the user's eyes in space (global) coordinate axis is calculated according to the direction of the face and the center points of both eyes (step 417). Finally, a cross point between the visual line vector and the display surface is calculated as the user's watching point (stap 418).

If the attention degree decision section 12 decides that the display is receiving the user's attention, the decision result is outputted to the indication output section 14. The indication output section 14 sets an attention status flag "ON". Then, the attention degree decision section 12 continues to calculate a position of the watching point on the display. If the watching point is not located within the predetermined radius of the center point on the display for a predetermined interval, the attention degree decision section 12 decides that the display is not receiving the user's of attention. In this case, the indication output section 14 sets the attention status flag as "OFF".

In order to decide whether the display is receiving the user's attention, a position for the TV camera 111 for the display should be determined. In general, the TV camera 111 is set to the upper part of the display. Therefore, the user's gaze direction relative to the TV camera is different than the user's gaze direction relative to the display because of parallax error. For example, if the TV camera 111 is set 30° lower than the upper part of the display, the user's gaze direction perpendicular to the TV camera does not correspond to the user watching the front, center of the display. Rather, when the direction of the user's gaze direction is 30° lower than the TV camera, the user's gaze direction is toward the front center of the display. In short, the gaze direction relative to the TV camera is different than the gaze direction relative to the display. Therefore, paralax correction of the gaze direction is necessary. The correction degree is changed in proportion to the height of the user. However, the correction degree is fixed if the user is always the same person. For example, the set position is determined as 30° lower when the TV camera 111 is set on the display. Then, a pattern of characteristic features of the user's face is registered in the computer. If the user watches the front of the display, the computer decides whether the display is receiving the user's attention according to the correction degree and the pattern.

The decision result of the attention degree decision section 12 is also outputted to the attention status display section 15. The attention status display section 15 turns a lamp "ON" while the attention status flag is "ON". The lamp "ON" indicates that the display is receiving the user's attention. Instead of the lamp "ON", various methods may be used, such as changing the cursor figure on the display or changing the cursor color. In this way, the user knows when the input apparatus can react to his indication action.

Figure 3B:
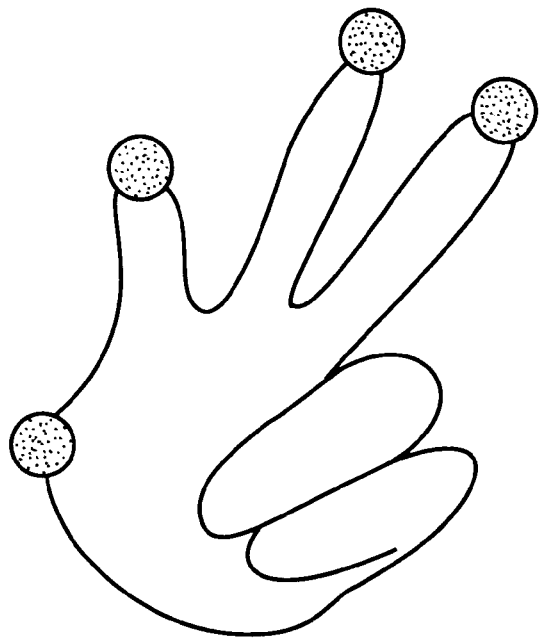
FIG. 3B is a schematic diagram of a glove to extract a hand's action for a gesture recogntion section.

In parallel with processing of the gaze direction detection section 11, the gesture recognition section 13 executes the processing. In the first embodiment, the image inputted by TV camera 111 is used for processing the gesture recognition section (TV camera 111 inputs the image of the user's face and gesture). FIG. 3B shows a glove to sense gestures of the user's fingers. Gesture recognition section 13 then extracts the gestures. As shown in FIG. 3B, a colored ball is respectively attached to each finger-tip and the lower part of the glove. Each ball has a different color. Otherwise, each shape/size of the ball or density of the color may be different. The user puts on the glove and directs the device according to predetermined hand gestures.

The color of each ball is previously registered in the computer. TV camera 111 inputs the image of the glove, and A/D conversion section 112 extracts the color area of the ball from the image according to the registered colors. In short, by detecting the movement of each colored ball, the user's gesture is detected. For example, several kinds of gesture are as follows.

(1) release indication of screen saver:

The user's right hand crosses from right side to left side in front of the display, while the palm of the right hand is held vertically.

(2) change of page (screen) on the display:

The user indicates a number such as 1, 2, by holding-up the corresponding number of fingers of the hand in front of the display. The number corresponds to 1st-page, 2nd-page on the display.

(3) control of video-display tool:

To display a video image on the computer, the operations of play, forward, and backward are controlled by gestures of the fingers, such as a toss, a sweep, or pointing.

In this way, the gesture recognition section 13 converts the extracted gesture into a movement indication signal and outputs that signal to the indication output section 14. If the attention status flag is "ON", the gesture recognition section 13 outputs the operation command corresponding to the movement indication signal to the computer.

In the first embodiment, the gesture recognition section 13 always recognizes gestures of the glove in both cases of the attention status flag "ON" and "OFF". However, the gesture recognition section 13 may only recognize the gesture in case the attention degree decision section decides that the display is receiving the user's attention. In this case, the processing load of the computer is greatly reduced.

If the computer display is receiving the user's attention, the movement indication signal of recognized gesture is outputted to the computer. Therefore, even if the user performs simple gestures (for example, hand movement up and down, right and left) which are not sufficient to be detected as an indication in the prior art, the simple action is detected as an indication in the present invention.

In the first embodiment, if the TV camera 111 accidentally inputs a person other than the user, the attention degree decison section 12 mistakenly decides that the display is receiving the user's attention. In order to avoid this situation, if a size of the user's face in the image is smaller than a threshold, the attention degree decision section 12 decides that the display is not receiving a user's attention. In this case, the situation that the person (except for the user) located far from the display is mistakenly recognized is avoided. Alternatively, the attention status display section 15 turns the lamp on to inform the user that the display is receiving the user's attention. In this case, the user can refrain from indicating unwanted action because he knows that the computer will mistakenly recognize the action. As mentioned above, in the first embodiment, the attention status of the user is determined using the user's gaze direction and the operation indication of the user is determined by gesture.

In the second embodiment of the invention, the attention status of the user is determined according to the user's voice recognized by a speech recognition section. The speech recognition section recognizes predetermined words such as "cursor" and "move". If the user says "cursor", the attention degree decision section decides that the display is receiving the user's attention for ten seconds from the word recognition. The user thus specifies the equipment to be operated by his voice and moves the cursor on the display by his actions. As in the first embodiment, even if the user mistakenly moves, the equipment is not mistakenly operated. When the user specifices the equipment by voice, the equipment reacts to the user's subsequent actions for a predetermined time.

In the third embodiment of the invention, the attention status of the user is determined by detecting the user's contact with the equipment. For example, the user always sits on one chair to operate a particular device. A pressure sensor is attached to that chair. When a user sits on the chair and the pressure sensor reacts, the display is decided to be receiving the user's attention. Then, the cursor is moved on the display according to the user's gestures.

A user looking aside may sit on the chair, and the display mistakenly decides to be under the status of attention. Therefore, a rotary encoder detects the direction angle of the chair. If the difference between the direction angle and a predetermined angle is smaller than a threshold, it is decided that the user sits on the chair in front of the display and the display is receiving the user's attention.

Figure 7:
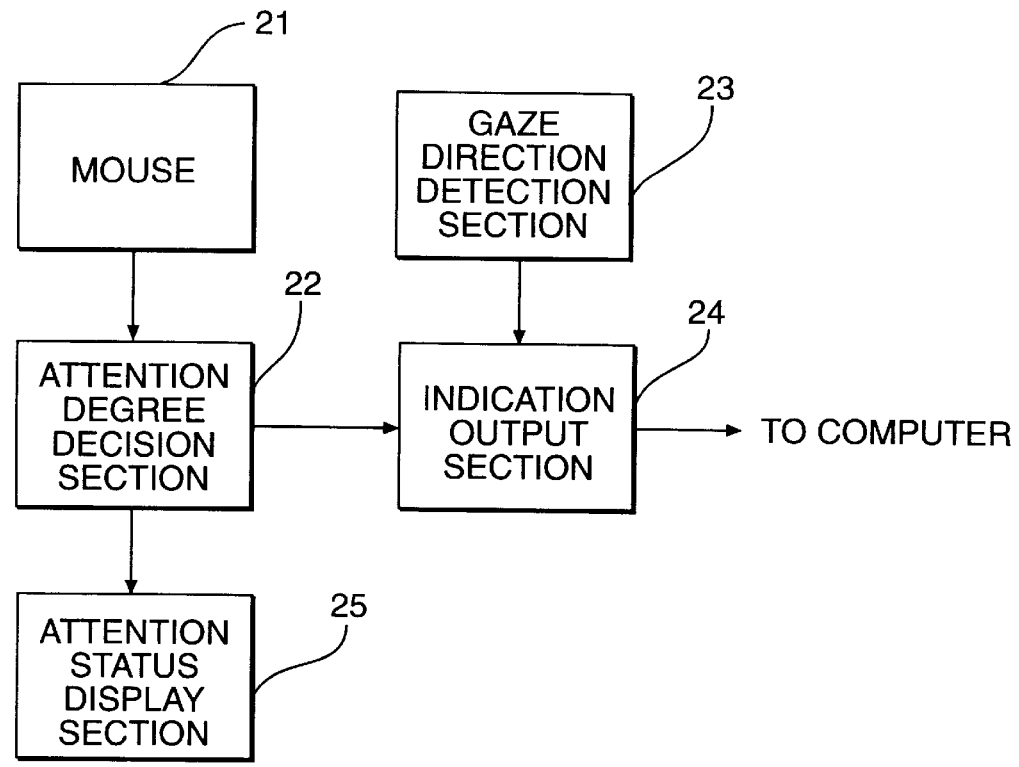
FIG. 7 is a block diagram of the input apparatus according to a fourth embodiment of the present invention.

FIG. 7 shows a schematic diagram of the input apparatus according to the fourth embodiment of the present invention. In the fourth embodiment, operation of the computer display is controlled by the user's gaze. As shown in FIG. 7, the input apparatus of the fourth embodiment is comprised of a mouse 21, an attention degree decision section 22, a gaze direction detection section 23, an indication output section 24, and an attention status display section 25. In the fourth embodiment, the attention status of the user is indicated by clicks of the mouse 21 and the operation indication of the user (For example, movement of the cursor position) is determined by the user's gaze.

When a switch on the mouse 21 is turned on by the user, the attention degree decision section 22 decides that the display is receiving the user's attention. Alternatively, a contact sensor may be attached to aside of the display, and the display may be decided to be receiving the user's attention when the contact sensor is turned on. In case the attention degree decision section 22 decides that the display is receiving the user's attention, the attention status display section 25 turns the lamp on, which informs the user that the display is receiving the user's attention. Then, the gaze direction detection section 23 detects the user's gaze (watching point) on the display, and the indication output section 24 outputs the information of the watching point to the computer.

Figure 8:
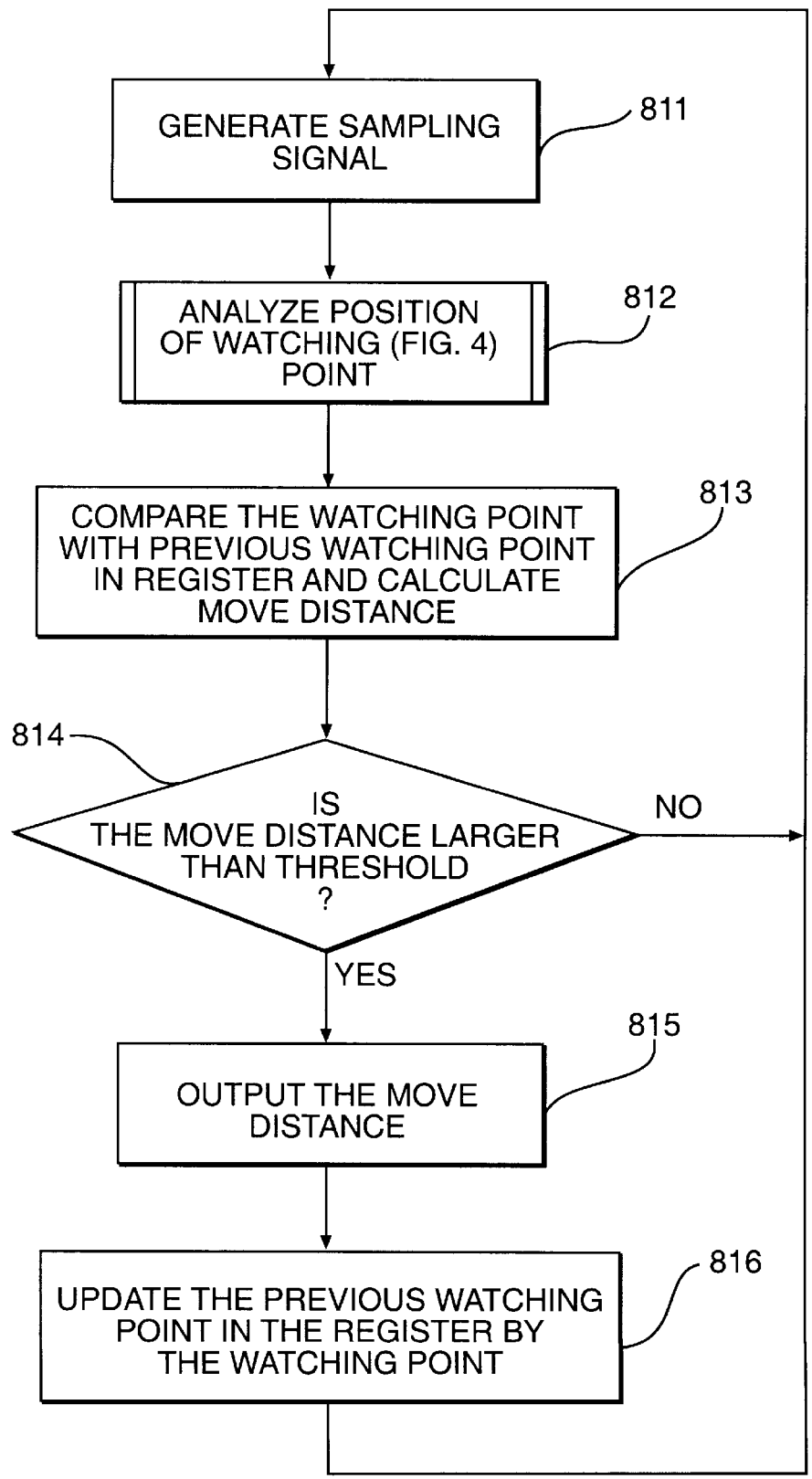
FIG. 8 is a flow chart of a calculation of the distance a watching point moves according to the fourth embodiment.

FIG. 8 is a flow chart of a calculation of the move distance a watching point moves. The calculation of the distance is executed whenever a sampling signal is supplied to the gaze direction detection section 23 (step 811). In the same way as in FIG. 4, the gaze direction detection section 23 calculates the watching point on the display according to the user's gaze (step 812). A previous watching point corresponding to a previous sample signal (before 1 timing) is stored in a register which is not shown in FIG. 7. The current watching point is compared with the previous watching point and the distance between the current watching point and the previous watching point is calculated (step 813). If the distance between the two points is larger than a threshold, the distance is sent to the computer (step 814, 815). Therefore, the cursor on the display is moved according to the calculated distance. The previous watching point in the register is then updated as the current watching point (step 816).

For example, the sampling signal is supplied to the gaze direction detection section 23 at 0.5 second intervals. Therefore, the calculation of the distance the user's watching point moves occus two times per one second.

In the fourth embodiment, the cursor on the display is controlled according to the distance of the user's gaze moves while the switch on the mouse is on. Therefore, the cursor on the display is not controlled by unconscious movements of the user's watching point but is controlled by intentional movements of the user's watching point.

Figure 9:
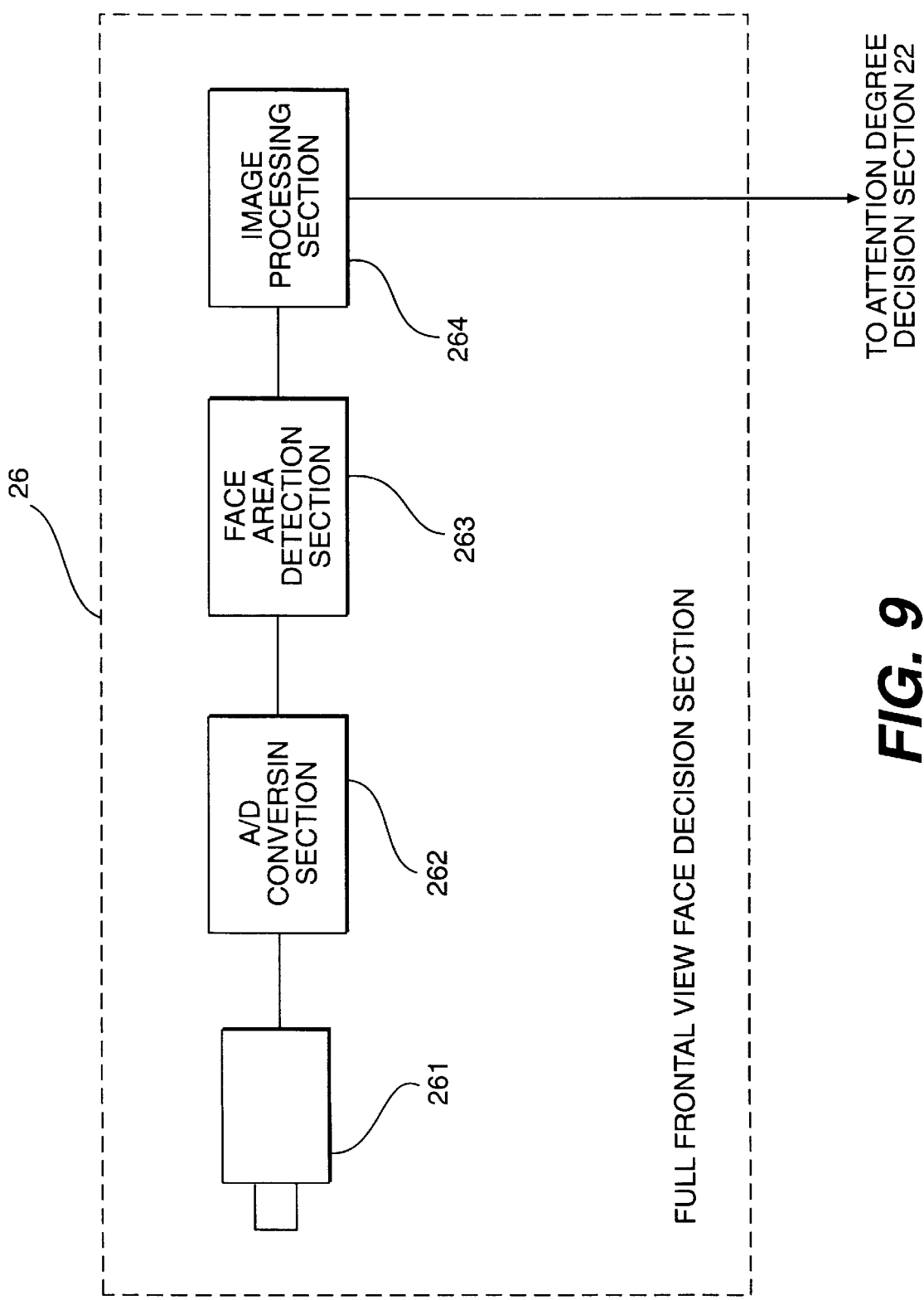
FIG. 9 is a block diagram of a full face decision section according to a fifth embodiment.

In the fifth embodiment, the user's attention status is determined by detecting whether the user's face direction is frontal of the display. A full frontal view face decision section 26 replaces the mouse 21 shown in FIG. 7. FIG. 9 is a schematic diagram of the full frontal view face decision section 26. As shown in FIG. 9, the full frontal view face decision section 26 is comprised of a TV camera 261, A/D conversion section 262, a face area detection section 263, and an image processing section 264. The TV camera 261 may be a commonly used TV camera in the gaze direction detection section 23 in FIG. 7. It is assumed that image inputted through TV camera 261 is the same as the image shown in FIG. 3A. A video signal outputted by TV camera 261 is converted to a digital image by A/D conversion section 262. The face area is extracted from the image by the face area detection section 263 and outputted to the image processing section 264. The image processing section 264 analyses characteristics of the face area and decides whether the user is facing the display within a predetermined distance.

One method of analysis is determining whether the face area is synmetric right and left along the center axis. Each ear is then extracted as same size. A ratio of the size of the face area to the size of the image is above a threshold if the person is close enough to the screen (for example, 30%). If the above conditions are satisfied, the user faces the display within the predetermined distance. In the fifth embodiment, the attention status of the user is decided by facing the equipment and operation indications are decided by the user's gaze.

In the sixth embodiment of the invention, a speech recognition section (not disclosed in FIG. 7) replaces the mouse 21 in FIG. 7. The speech recognition section recognizes the user's voice speaking words such as "move" and "cursor". The attention degree decision section 22 decides that the display is receiving the user's attention upon speech recognition. As in the fifth embodiment, the user's gaze direction is detected and the cursor position is controlled by the direction. It is not necessary that the user speak and control the cursor position at the same time. For example, a 15 second interval may elapse from the time that predetermined word is recognized during which the cursor may be moved. In another method, the attention status may begin according to the word "start" and end according to word "stop".

The recognized word may be any word, as long as the user knows that the equipment is under the status of attention by his speaking the word. Each user may set a different word. Alternatively, each device may be activated by a different word. This avoids confussion if multiple devices are placed in the same room. In the sixth embodiment, the attention status of the user is decided by sound and operation indication is decided by the user's gaze.

Figure 10:
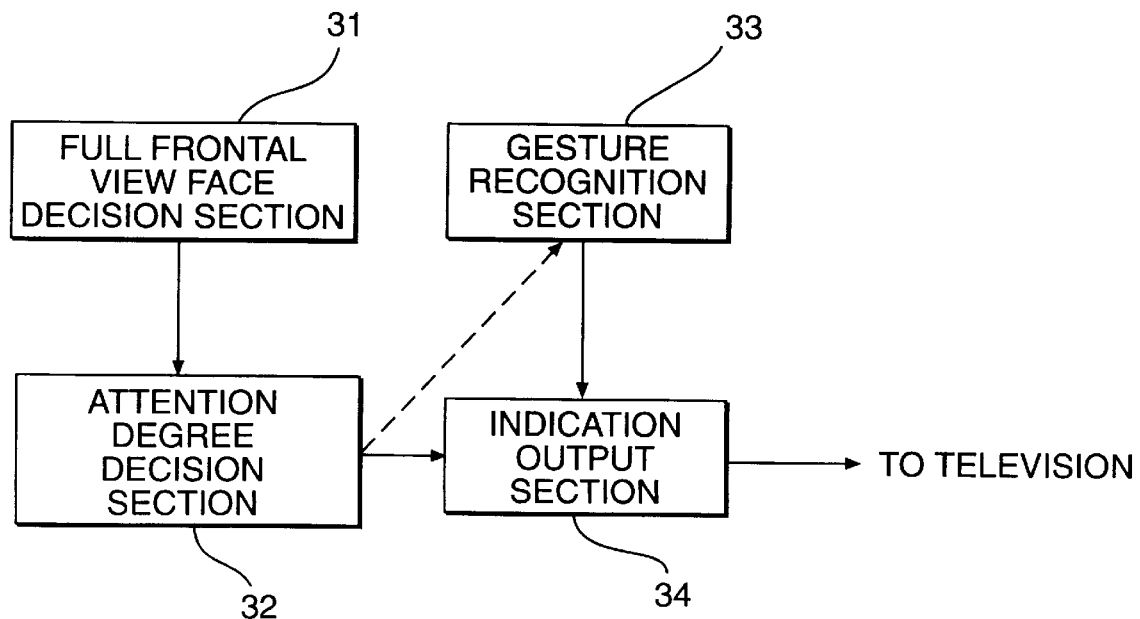
FIG. 10 is a block diagram of the input apparatus according to a seventh embodiment of the present invention.

In the seventh embodiment of the invention, the attention status is decided by the full frontal view face decision section and the operation indication is decided by the gesture recognition section. FIG. 10 is a schematic diagram of the input apparatus according to the seventh embodiment. As shown in FIG. 10, the input apparatus is comprised of a full frontal view face decision section 31, an attention degree decision section 32, a gesture recognition section 33, and an indication output section 34. The processing in the full frontal view face decision section 31 is the same as in the full frontal view face decision section 26 of the fifth embodiment. However, in comparison with the fifth embodiment, it often happens that the position of the user's face is apart from the home TV. If the user always approaches the display, the face area of the user is largely included in the image. In this case, the ratio of the size of the face area to the size of the input image can be used in same way as in the fifth embodiment.

If the user pays attention to the home TV, the gesture recognition section 33 recognizes gestures of the user's hand. The indication output section 34 outputs an indication signal to the display according to the recognition result. For example, each operation is assigned a number (one, two, three . . . ). The user then indicates the desired number. The forefinger alone forms one. The forefinger and the middle finger form two. The forefinger, the middle finger, and the third finger form three. In the seventh embodiment, the problem of accidentally operates more than one device is avoided. Only the device the user faces will operate in response to the user.

Figure 11:
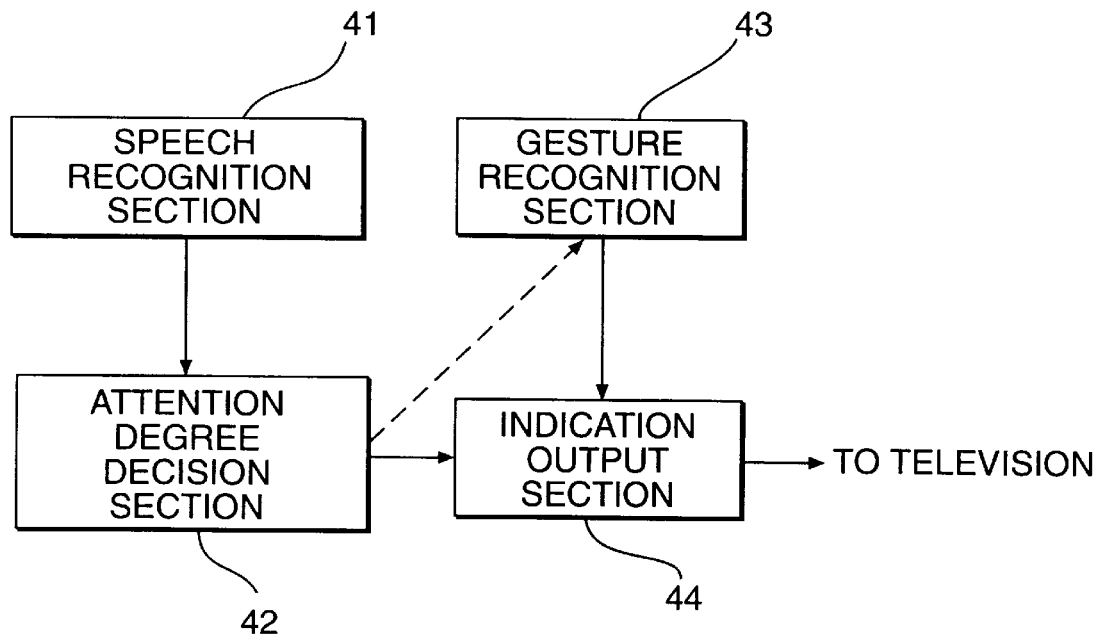
FIG. 11 is a block diagram of the input apparatus according to an eighth embodiment of the present invention.

In the eighth embodiment, the user's attention status is determined by speech, and the operation indication is indicated by gesture. FIG. 11 is a block diagram of the input apparatus of the eighth embodiment. The input apparatus of the eighth embodiment is comprised of a speech recognition section 41, an attention degree decision section 42, a gesture recognition section 43, and an indication output section 44. The speech recognition section 41 recognizes the user speaking words such as "television" and "screen" which are predetermined words to indicate the user's attention. A recognition signal is then outputted to the attention degree decision section 42. The attention degree decision section 42 sets an attention status flag of the indication output section 44 "ON" according to the signal of the recognition result. In this way, a home television is determined to be receiving the user's attention according to the user's voice. Therefore, even if there are many gesture operated devices in room, the home television only reacts to the user's gesture after the predetermined word is recognized. Other devices are not mistakenly operated.

Figure 12:
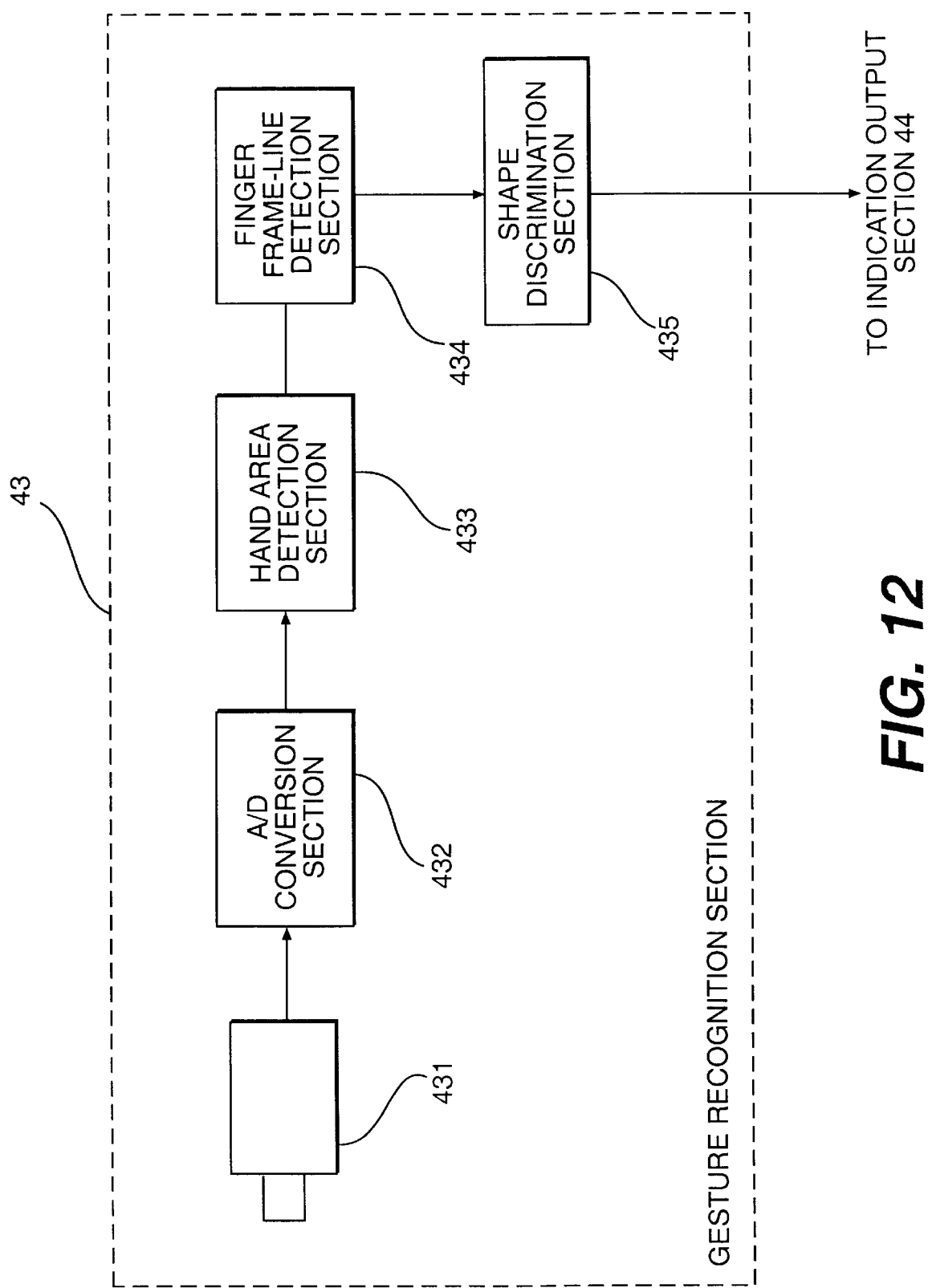
FIG. 12 is a block diagram of the gesture recognition section according to the eighth embodiment.

FIG. 12 is a schematic diagram of the gesture recognition section 43. The gesture recognition section 43 is comprised of a TV camera 431, an A/D conversion section 432, a hand area detection section 433, a finger frame-line detection section 434, and a shape descrimination section 435.

Figure 13:
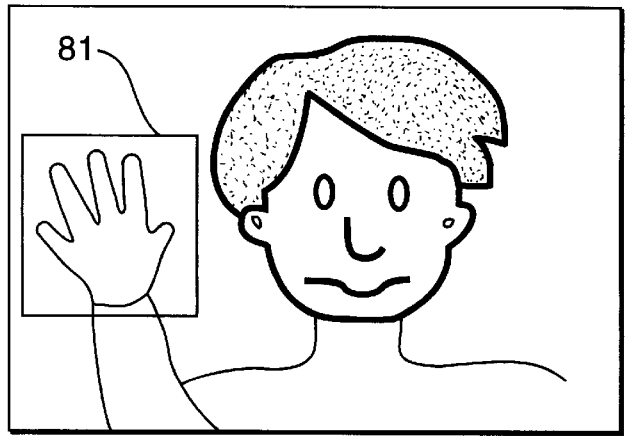
FIG. 13 is a schematic diagram of the full frontal view face-image of the user.
Figure 14:
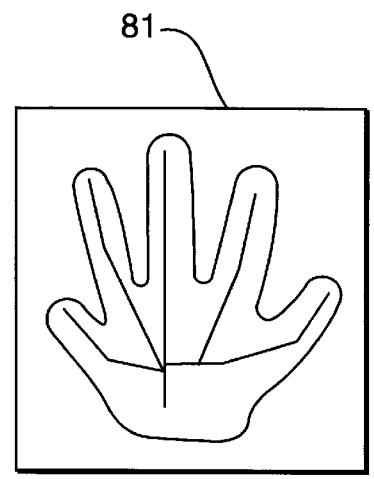
FIG. 14 is a schematic diagram of the finger-frame of the user's hand to be extracted by the gesture recognition section of the eighth embodiment.

FIG. 13 is a schematic diagram of a user's face and hand on the image inputted by TV camera 431. A/D conversion section 432 converts the image shown in FIG. 13 to a digital image. The hand area detection section 433 receives the degital image. The hand area detection section 433 detects hand area 81 from the image according to color information of the user's hand. The hand area image 81 is outputted to the finger frame-line detection section 434. The finger frame-line detection section 434 extracts frame-lines of each finger from the hand area image through a line-thinning processing. FIG. 14 is a schematic diagram of the frame-line detected from the hand area image 81. The frame-line information is outputted to the shape descrimination section 435. The shape descrimination section 435 descriminates the finger pattern according to the frame-line information. As in the seventh embodiment, each operation of the home television corresponds to a number #(one, two, three . . . ). FIG. 14 shows the number "five" shaped by the user's five fingers. A shape descrimination signal indicates the displayed number is outputted to the indication output section 44.

In the eighth embodiment, the quantity of information to be processed by the gesture recognition section 43 is larger than that of the sound recognition section 41. Therefore, the gesture recognition section 43 may process while the attention degree decision section 42 sets the attention status flag "ON". In this case, the attention degree decision section 42 outputs the predetermined signal to the gesture recognition section 43 while the attention status flag is "ON". The gesture recognition section 43 recognizes gestures of the user's fingers while the predetermined signal is inputted. Thus, when the home television receives the user's attention, the indication output section 44 outputs the operation signal of the gesture recognition result of the home television.

Figure 15:
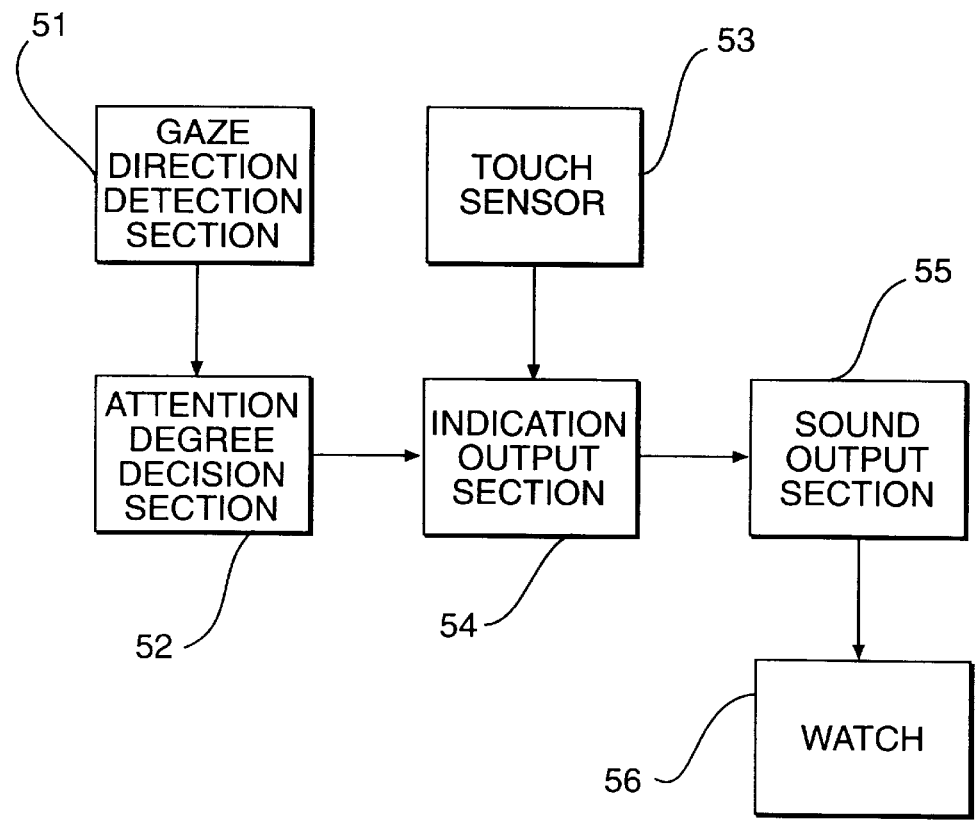
FIG. 15 is a block diagram of the input apparatus according to the ninth embodiment of the present invention.

In the ninth embodiment of the invention, the attention status is determined by the user's gaze and the operation indication is indicated by touching the equipment. FIG. 15 is a schematic diagram of the input apparatus connected to a watch according to the ninth embodiment. As shown in FIG. 15, the input apparatus is comprised of a gaze direction detection section 51, an attention degree decision section 52, a touch sensor 53, an indication output section 54, a sound output section 55, and a watch 56.

In the ninth embodiment, if the user looks at the watch 56 and touches the watch 56, the watch 56 automatically speaks the current time. The gaze direction detection section 51 such as a TV camera detects the direction of the user's gaze as in the first embodiment. The attention degree decision section 52 decides whether the watch is under the status of attention according to the direction of the user's gaze. Then, the indication output section 54 outputs an indication signal to the sound output section 55 according to the detection result of the touch sensor 53. The sound output section 55 detects the current time from the watch 56 and outputs the time as sound through a speaker (For example, "present time is three thirty p.m.").

The touch sensor 53 is attached to the watch or set at predetermined position near the watch (For example, pocket of the user's wear in which the watch is included). If the touch sensor 53 is attached to the watch, the TV camera may be blocked by the user's hand and the image can not be inputted while the user's hand touches the touch sensor of the watch. If the attention degree section 52 decides that the watch is receives the user's attention, the indication output section 54 sets an attention status flag "ON" for a predetermined interval (for example, 15 seconds). In this way, the attention status flag is "ON" for a predetermined interval from the decision timing. Accordingly, the present invention can be applied to equipment (such as a watch) that receives operation indication input after the attention status is determined.

In the ninth embodiment, when the user looks at the wristwatch and touches his ear to the wristwatch to listen to the time, the wristwatch automatically speaks the current time. This kind of wristwatch is convenient for persons with poor eye sight. In daily life, however, the user may touch to the watch an intentionally. The watch of the present invention however automatically speaks the time only if the watch is receiving the user's attention. Therefore, the watch does not automatically speak the time unnecessarily. During night time the face of the wristwatch can not be seen, but an infrared rays sensor can detect the direction of the user's gaze. Therefore, even if the user touches his ear to the wristwatch at night, the wristwatch automatically speaks the time as in the daytime.

In the tenth embodiment of the invention, the attention status is determined by the user facing the equipment and the operation indication is indicated by the user's approaching action to the equipment. The input apparatus of the tenth embodiment can be applied to opening and shuting an automatic door at the entrance of a building.

In the prior art, the automatic door switch is set "ON" or "OFF" using a pressure sensor or an infrared ray sensor to detect the presence of a person. However, if the area surrounding the door is crowded, a person with no intention of opening the door may approach the door. For example, he accidentally approaches the door to avoid a crowd or he comes near the door while moving backwards. In these cases, the automatic door of the prior art opens.

In the tenth embodiment, the attention degree decision section decides whether a person comes near the front of the door. For example, if both eyes of the person are detected from the image of the person inputted through a TV camera, it is decided that a person with the intention of opening the door has approached the door. The indication output section outputs operation signal using the pressure sensor or the infrared ray sensor attached near the door. In short, if a person decides to approach the front of the door and the sensor detects the presence of the person (the person is willing to enter inside the door), the door opens.

In the eleventh embodiment of the invention, the attention status is determined by the user's gaze direction and the operation indication is indicated by touching the equipment. The input apparatus of the eleventh embodiment is applied to a computer keyboard.

The prior art keyboard detects when the user pushes down a predetermined key and outputs an operation signal corresponding to the computer key. However, in the prior art, the keyboard may detect a key stroke even though the user did not intend to push the key. For example, an object may accidentally fall on the keyboard and a key is pushed down by the object. If the user thinks about something while facing the computer display, the user's hand on the keyboard may accidentally push down a key.

Figure 16:
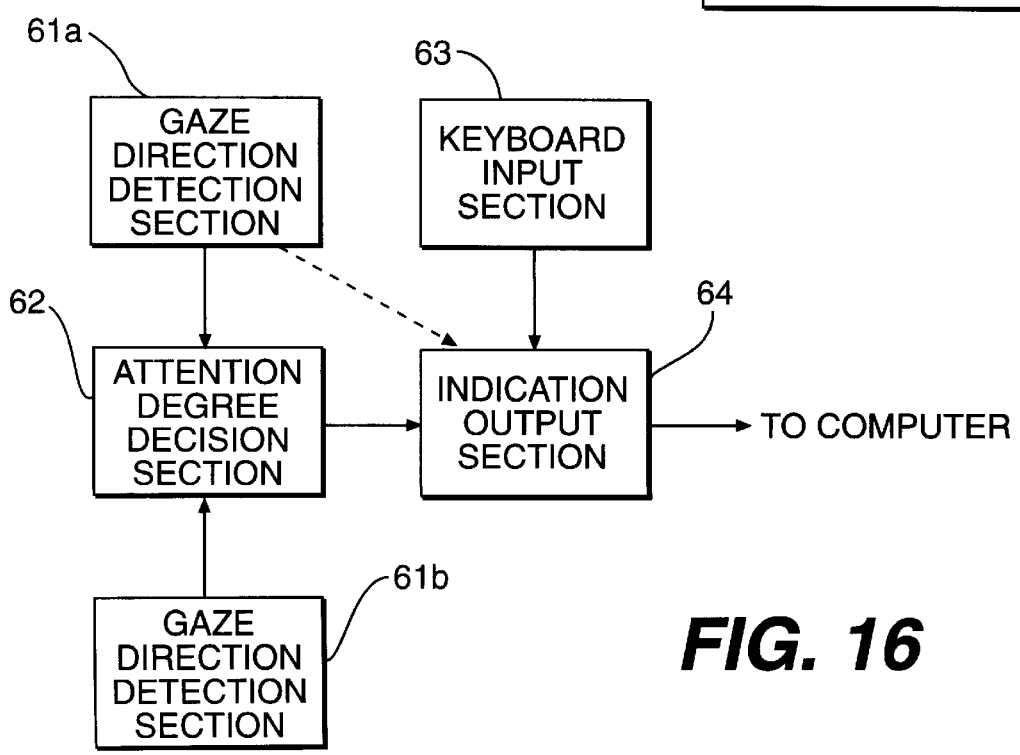
FIG. 16 is a block diagram of the input apparatus according to an eleventh embodiment of the present invention.

FIG. 16 is a schematic diagram of the input apparatus according to the eleventh embodiment. As shown in FIG. 16, the input apparatus is comprised of gaze direction detection sections 61a and 61b, an attention degree decision section 62, a keyboard input section 63, and an indication output section 64. The attention degree decision section 62 decides whether the keyboard is under the status of attention according to the output of the gaze direction detection sections 61a and 61b. The processing in the gaze direction detection sections 61a and 61b is same as that in the gaze direction detection section 11 of the first embodiment. The gaze direction detection section 61a, such as a TV camera, is attached to the computer keyboard, and the gaze direction detection section 61b, such as another TV camera, is attached to the computer display to input images of the user's face.

The attention degree decision section 62 decides whether the display is receiving the user's attention. If the user's gaze is directed to the keyboard or if the user's gaze is directed to within a predetermined radius from the center point or from the cursor point of the display, the user's attention is determined to be directed to the computer.

The indication output section 64 detects key input of the keyboard. The keyboard input section 63 sends a signal corresponding to the pushed key to the indication output section 64. While the keyboard is receiving the user's attention, the indication output section 64 outputs the signal from the keyboard input section 63 to the computer. If the gaze direction detection section 61a detects the position of visual line more precisely, a plurality of attention status flags corresponding to each key of the keyboard are set in the gaze direction detection section 61a and the "ON"/"OFF" status of each attention status flag is sent to the indication output section 64.

For example, if the "A" key of the keyboard is determined to be receiving the user's attention, the attention status flag corresponding to each key neighboring the "A" key on the keyboard is set "ON" and this status information is sent to the indication output section 64. When input key information is outputted from the keyboard input section 63 to the indication output section 64, the indication output section 64 checks whether the attention status flag corresponding to the input key is "ON" or "OFF" according to the status information of each key neighboring the "A" key. If the attention status flag of the input key is "ON", the indication output section 64 outputs the input key signal to the computer.

It often happens that the user operates the keyboard while looking at text without looking at the keyboard. In this case, the gaze direction detection sections 61a and 61b cannot detect the direction of the user's gaze, because the direction of the user's gaze crosses neither the keyboard nor the display. Therefore, the computer includes a hand-operated switch (For example, a sensor attached to the chair in front of the computer which is set to "ON" when the user sits on the chair). The display is decided to be under the status of attention when the hand-operated switch is "ON". Then, the attention degree decision section 62 sets the attention status flag of the indication output section 64 "ON". In short, if this kind of switch is attached to the computer in spite of the gaze direction detection sections 61a and 61b, this modification of the eleventh embodiment is effective in the same way.

Figure 17:
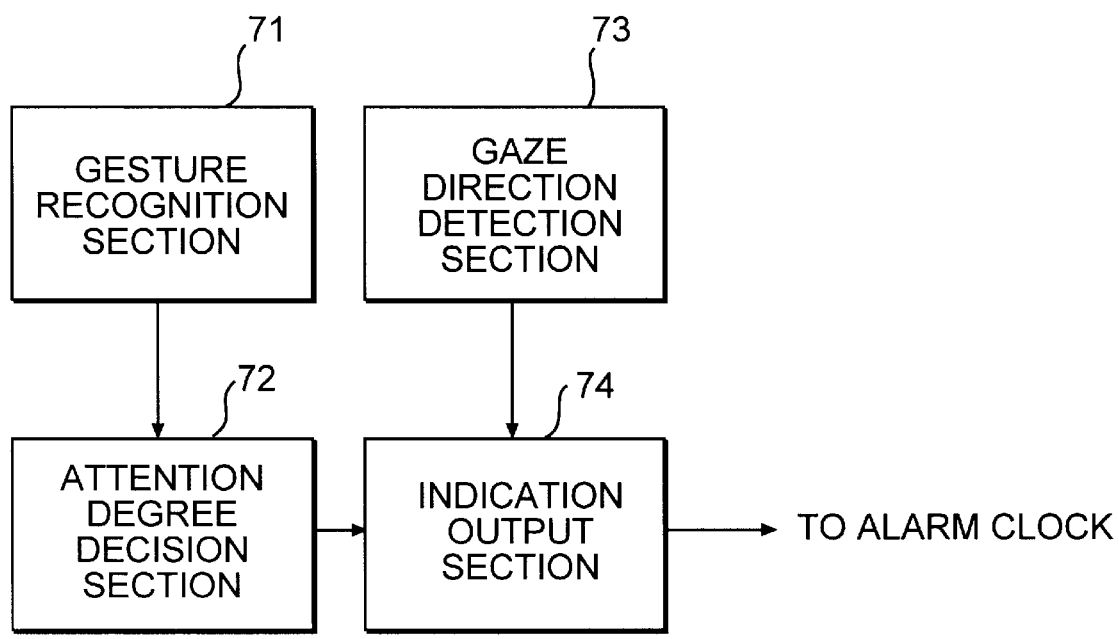
FIG. 17 is a block diagram of the input apparatus according to a twelfth embodiment of the present invention.

In the twelfth embodiment of the invention, the attention status is determined by gestures of the user's hand and the operation indication is decided by direction of the user's gaze. FIG. 17 is a schematic diagram of the input apparatus of the twelfth embodiment applied to an alarm clock. As shown in FIG. 17, the input apparatus of the twelfth embodiment is comprised of a gesture recognition section 71, an attention degree decision section 72, a gaze direction detection section 73, and an indication output section 74.

Figure 18:
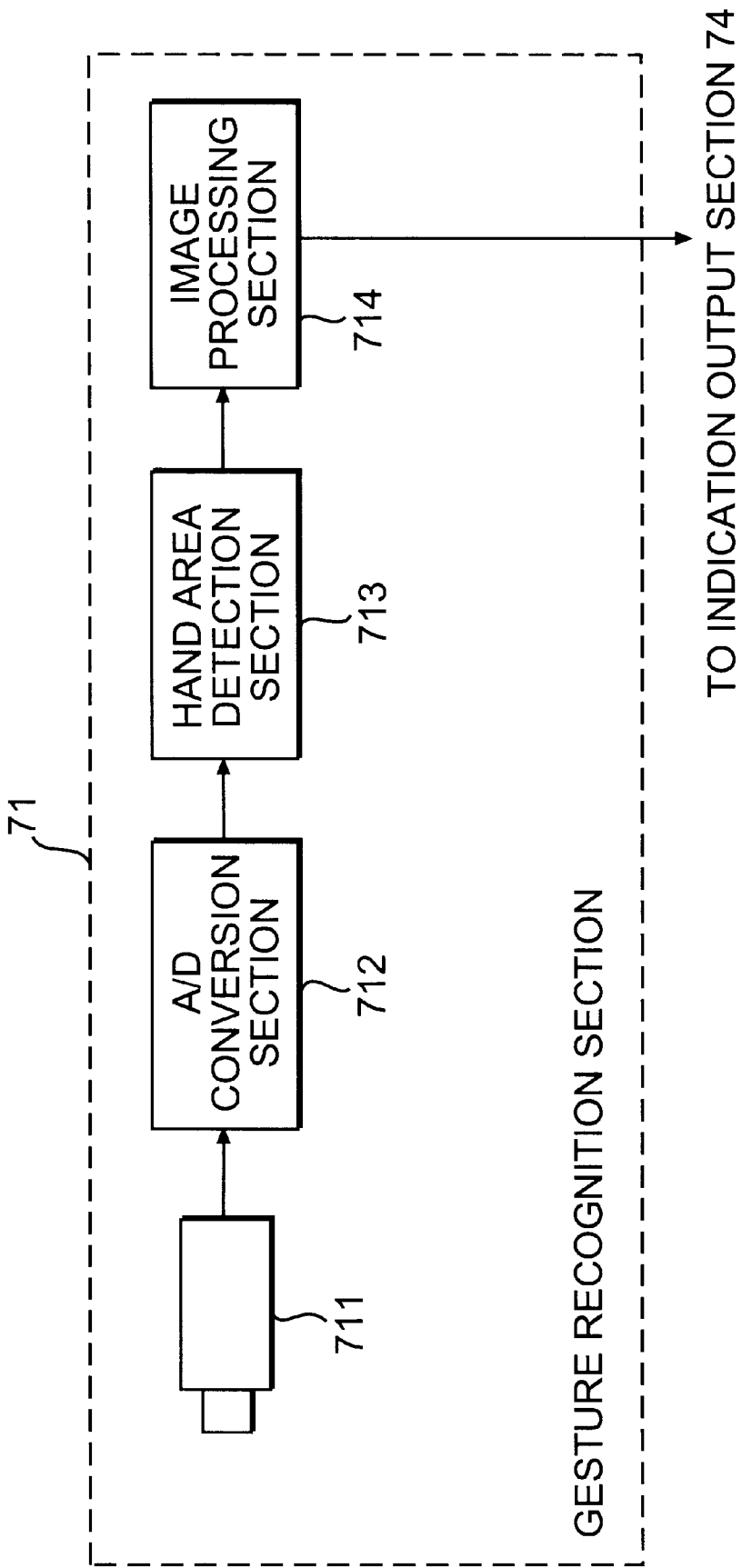
FIG. 18 is a block diagram of the gesture recognition section of the twelfth embodiment.

FIG. 18 is a schematic diagram of the gesture recognition section 71. As shown in FIG. 18, the gesture recognition section 71 is comprised of a TV camera 711, an A/D conversion section 712, a hand area detection section 713, and an image processing section 714. TV camera 711 of the gesture recognition section 71 inputs images neighboring the alarm clock. The gaze direction detection section 73 executes the same processing as the gaze direction detection section 11 of the first embodiment.

The alarm clock rings at a set time. If the user still feels sleepy, he sometimes gropes for the alarm clock, turns off the switch of the alarm clock, and sleeps again. And he can do them unconsciously. Therefore, in the twelfth embodiment, an alarm clock whose switch is not turned off by the user's unconscious action is provided.

First, in FIG. 18, the image neighboring the alarm clock is outputted from TV camera 711 to the A/D conversion section 712. The image is converted to a digital image by the A/D conversion section 712 and outputted to the hand area detection section 713. The hand area detection section 713 detects the hand area from the image in the same way as the gesture recognition section 43 of the eighth embodiment. The hand area of the user is then sent to the image processing section 714. The image processing section 714 calculates a center of gravity for each hand area and calculates the distance the center of gravity moves in time series. If the user shakes his hand in front of the alarm clock (TV camera 711), the image processing section 714 decides that the alarm clock is receiving the user's attention according to the distance the center of gravity moves.

If the user really feels sleepy, he can shake his hand but cannot open his eyes. Therefore, in the twelfth embodiment, the user must watch the alarm clock to turn off the switch of the alarm clock. The switch of the alarm clock is turned off by both hand shaking and watching. The visual line direction detection section 73 decides whether the user opens his eyes or not. In same way of the first embodiment shown in FIG. 2, the eye area detection section 114 detects the eye size of the user. If the eye size is larger than a threshold, it is decided that the user has opened his eyes.

It is necessary the eye area is detected accurately. The eye area will appear black or dark against the eye. Accordingly, the TV camera 711 (position, posture) is set in order to input image of area close by the alarm clock only. The switch of the alarm clock is turned off only if the user certainly shakes his hand in front of the alarm clock and watches the alarm clock. In the twelfth embodiment, the user's hand shaking as attention status and the user's watching as operation indication are necessary to turn off the switch of the alarm clock. This is natural action for the user in case of awakening in daily life. Even the user feels very sleepy, the user must awaken to turn off the alarm clock.

In the thirteenth embodiment, the attention status is decided by the user's voice and the operation indication is decided by the user's gaze direction. The input apparatus of the thirteenth embodiment is applied for controlling the switch of an alarm clock in same way as in the twelfth embodiment. A speech recognition section is the input apparatus instead of the gesture recognition section 71 of the twelfth embodiment. The operation indication to turn off the switch is the detection of the user's gaze direction in same way as in the twelfth embodiment. The speech recognition section recognizes the user's speaking set words(For example, "I am awake" or "I am up"). A predetermined period from the recognition timing of the word (For example, 15 seconds) is decided for the alarm clock to be under the status of attention. During this period, the gaze direction detection section detects the direction of the user's gaze. If it is decided that the user opens his eyes, the switch of the alarm clock is turned off.

The present invention is also applied to the following, additional embodiments.

The attention status is decided by the direction of the user's visual line, and the operation indication is decided by the user's approaching action to the equipment.

The attention status is decided by the user's approaching action to the equipment, and the operation indication is decided by the direction of the user's gaze.

The attention status is decided by the user's approaching action to the equipment, and the operation indication is decided by a gesture of the user's hand or body.

The attention status is decided by a gesture of the user's hand or body, and the operation indication is decided by the user's touch to the equipment.

The attention status is decided by a gesture of the user's hand or body, and the operation indication is decided by the user's approaching action to the equipment.

A memory can be used to store instructions for performing the process described above, such a memory can be a CD-ROM, floppy disk, hard disk, magnetic tape, semiconductor memory, and so on. The instructions can then direct the operation of a computer including a computer built into an input device.

What is claimed is:

1. An input apparatus for detecting a user's action that indicates an input command and for outputting an operation signal corresponding to the input command to an electronic device, comprising:

attention detection means for continuously detecting a first action of the user that indicates an attention status of the user, and for deciding that the electronic device is under the attention status of the user while the first action of the user is continuously detected;

action detection means for detecting a second action of the user that indicates the input command in accordance with the second action of the user, wherein the second action is different from the first action; and operation signal output means for outputting the operation signal corresponding to the input command to the electronic device, if the second action is detected while the first action is continuously detected.

2. The input apparatus according to claim 1,
wherein the first action comprises continuously gazing at a predetermined part of a device receiving the operation signal, and the attention detection means comprises means for extracting feature points from a face image of the user and means for calculating a watching point of the user based on said feature points, wherein the second action comprises a gesture corresponding to the input command, and the action detection means comprises means for recognizing the gesture from a predetermined movement in a partial image of the user.

3. The input apparatus according to claim 1,
wherein the first action comprises producing voice as a predetermined word, and the attention detection means comprises means for recognizing the predetermined word, wherein the second action comprises a gesture corresponding to the input command, and the action detection means comprises means for recognizing the gesture from a predetermined movement in a partial image of the user.

4. The input apparatus according to claim 1,
wherein the first action comprises continuously touching by the user a part of a device receiving the operation signal, and the attention detection means comprises means for detecting said touching with a sensor attached to the part of the device, wherein the second action comprises a gesture corresponding to the input command, and the action detection means comprises means for recognizing the gesture from a predetermined movement in a partial image of the user.

5. The input apparatus according to claim 1,
wherein the first action comprises touching by the user a part of the device receiving the operation signal and the attention detection means comprises means for detecting said touching when a switch attached to the part is turned on, and wherein the second action comprises gazing at a predetermined part of the device, and the action detection means comprises means for extracting feature points from a face image of the user and means for calculating a watching point of the user based on said feature points.

6. The input apparatus according to claim 1,
wherein the first action comprises continuously facing by the user the front of a device receiving the operation signal, and the attention detection means comprises means for determining whether the user's face direction is frontal of the device by feature points of the user's face image, and wherein the second action comprises gazing at a predetermined part of the device, and the action detection means comprises means for extracting feature points from the user's face image and means for calculating a watching point of the user based on said feature points.

7. The input apparatus according to claim 1,
wherein the first action comprises producing voice as a predetermined word, and the attention detection means comprises means for recognizing the predetermined word, and wherein the second action comprises gazing at a predetermined part of a device receiving the operation signal, and the action detection means comprises means for extracting feature points from the user's face image and means for calculating a watching point of the user based on said feature points.

8. The input apparatus according to claim 1,
wherein the first action comprises continuously facing by the user the front of a device receiving the operation signal and the attention detection means comprises means for determining whether the user's face direction is frontal of the device based on feature points of the users face image, and wherein the second action comprises a gesture corresponding to the input command, and the action detection means comprises means for recognizing the gesture from a predetermined movement in a partial image of the user.

9. The input apparatus according to claim 1, wherein the first action comprises gazing at a predetermined part of a device receiving the operation signal, and the attention detection means comprises means for extracting feature points from the user's face image and means for calculating a watching point of the user based on said feature points, and wherein the second action comprises touching the device by the user, and the action detection means comprises means for detecting said touching by the user with a sensor attached to the device.

10. The input apparatus according to claim 1, wherein the first action comprises continuously facing by the user the front of a device receiving the operation signal, and the attention detection means comprises means for determining whether the user's face direction is frontal of the device by feature points of a facial image of the user, and wherein the second action comprises approaching the device by the user, and the action detection means comprises means for detecting said approaching with a sensor attached to the device for detecting an approach by the user.

11. The input apparatus according to claim 1, wherein the first action comprises a gesture corresponding to a predetermined movement, and the attention detection means comprises means for recognizing the gesture from the predetermined movement in a partial image of the user, and wherein the second action comprises gazing at a predetermined part of a device receiving the operation signal, and the action detection means comprises means for extracting feature points from a facial image of the user and means for calculating a watching point of the user based on said feature points.

12. The input apparatus according to claim 1, further comprising means for outputting a report that the attention status is detected by the attention detection means.

13. The input apparatus according to claim 1, wherein said signal output means includes means for outputting the operation signal to a watch.

14. The input apparatus according to claim 1, wherein said signal output means includes means for outputting the operation signal to a computer having a keyboard, said operation signal corresponding to a key pushed by touching of the keyboard by the user.

15. The input apparatus according to claim 1, wherein said signal output means includes means for outputting the operation signal to an automatic door.

16. The input apparatus according to claim 1, wherein said signal output means includes means for outputting the operation signal to a home electronic device.

17. A method for detecting a user's action that indicates an input command and for outputting an operation signal corresponding to the input command to an electronic device, comprising the steps of:

continuously detecting a first action of the user that indicates an attention status of the user;

deciding that the electronic device is under the attention status of the user while the first action is continuously detected;

detecting a second action of the user that indicates an input command in accordance with the second action of the user, wherein the second action is different from the first action; and outputting the operation signal corresponding to the input command, if the second action is detected while the first action is continuously detected.

18. The method according to claim 17, wherein the first action comprises continuously gazing at a predetermined part of a device receiving the operation signal, and wherein a watching point of the user is calculated from a face image of the gazing user.

19. The method according to claim 17, wherein the first action comprises continuously touching a part of a device receiving the operation signal, the user's touching being detected by a sensor attached to the part of the device.

20. The method according to claim 17, wherein the first action comprises continuously facing by the user the front of a device receiving the operation signal, and wherein the user's face direction is determined to be frontal of the device by feature points of the user's face image.

21. A computer readable memory containing computer-readable instructions, comprising:

instruction means for causing a computer to continuously detect a first action of the user that indicates the attention status of the user;

instruction means for causing the computer to decide that an electronic device is under the attention status of the user while the first action of the user is continuously detected;

instruction means for causing the computer to detect a second action of the user that indicates an input command in accordance with the second action of the user, wherein the second action is different from the first action; and instruction means for causing the computer to generate an operation signal corresponding to the input command to the electronic device, if the second action is detected while the first action of the user is continuously detected.

* * * * *